United States Patent
Chan et al.

(10) Patent No.: US 9,757,755 B2
(45) Date of Patent: Sep. 12, 2017

(54) MASKING STRIP

(75) Inventors: Kin-Chau Chan, Tamworth (GB); Kevin M. Eliason, River Falls, WI (US); Gary N. Brotherton, Warwickshire (GB); Colin D. Sinclair, Coventry (GB); Anna B. Baker, Nottingham (GB); Roy Stubbs, Warwickshire (GB); Jeffrey J. Schwab, Inver Grove Heights, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 589 days.

(21) Appl. No.: 13/995,703

(22) PCT Filed: Dec. 22, 2011
(Under 37 CFR 1.47)

(86) PCT No.: PCT/US2011/066781
§ 371 (c)(1),
(2), (4) Date: Jan. 8, 2014

(87) PCT Pub. No.: WO2012/088392
PCT Pub. Date: Jun. 28, 2012

(65) Prior Publication Data
US 2015/0306621 A1    Oct. 29, 2015

(30) Foreign Application Priority Data
Dec. 24, 2010    (GB) .................................. 1021984.8

(51) Int. Cl.
*B05B 15/04*    (2006.01)
*B05D 7/14*    (2006.01)
(Continued)

(52) U.S. Cl.
CPC ...... *B05B 15/0462* (2013.01); *B05B 15/0456* (2013.01); *B05B 15/0468* (2013.01);
(Continued)

(58) Field of Classification Search
None
See application file for complete search history.

(56) References Cited

U.S. PATENT DOCUMENTS 5,871,835 A    2/1999    Voss
5,885,395 A    3/1999    Western
(Continued)

FOREIGN PATENT DOCUMENTS

EP    2080562    7/2009
GB    1555808    11/1979
(Continued)

OTHER PUBLICATIONS

PCT International Search Report for PCT/US2011/066781, mailed Feb. 22, 2012.

*Primary Examiner* — Dah-Wei D Yuan
*Assistant Examiner* — Jethro M Pence
(74) *Attorney, Agent, or Firm* — Aleksander Medved

(57) ABSTRACT

A masking strip for masking the interior surfaces of a gap between two substrates to be painted is provided, the strip comprising: a backing having a first surface and a second surface, the first surface having an adhesive region to fix the masking strip to an interior surface of the gap; a gap filler extending from the backing and adapted to prevent paint flow into the gap; wherein the first surface of the backing is also provided with a spacing means adapted to space the backing of the masking strip away from the interior surface of the gap to which the strip is fixed, and wherein the masking strip is pre-formed.

19 Claims, 10 Drawing Sheets

(51) Int. Cl.
*B05C 21/00* (2006.01)
*C09J 7/02* (2006.01)

(52) U.S. Cl.
CPC .............. *B05C 21/005* (2013.01); *B05D 7/14* (2013.01); *C09J 7/0289* (2013.01); *C09J 2201/28* (2013.01); *C09J 2203/31* (2013.01)

(56) References Cited

U.S. PATENT DOCUMENTS

| | | |
|---|---|---|
| 6,337,127 B1 | 1/2002 | Voss |
| 6,887,553 B1 * | 5/2005 | Heil ................... B05B 15/0456 118/505 |
| 8,399,058 B2 | 3/2013 | Eliason |
| 2004/0109984 A1 | 6/2004 | Bouic |
| 2004/0127121 A1 * | 7/2004 | Schwab ................ C09J 7/0296 442/46 |
| 2008/0118656 A1 | 5/2008 | Douglas |

FOREIGN PATENT DOCUMENTS

| | | |
|---|---|---|
| JP | 63-168063 | 11/1988 |
| JP | H03-094969 U | 9/1991 |
| JP | 08-209081 | 8/1996 |
| JP | 2000-118858 | 4/2000 |
| WO | WO 80/02391 | 11/1980 |
| WO | WO 83/04380 | 12/1983 |
| WO | WO 99/52646 | 10/1999 |
| WO | WO 00/30761 | 6/2000 |
| WO | WO 02/068556 | 9/2002 |
| WO | WO 2008/154559 | 12/2008 |

* cited by examiner

MASKING STRIP

TECHNICAL FIELD

The invention disclosed herein relates to a masking strip for masking the interior of a gap between two substrates to be painted, and more specifically for use during the spray painting of a vehicle or other large body.

BACKGROUND TO THE INVENTION

The outer body of a vehicle has parts which move relative to each other, for example, static door posts and movable door frames. There exists a visible gap, which is usually curved, created between the fixed and movable parts. The width and depth of the gap varies depending on the model of the vehicle and the relative position of the static and movable part. Similarly, a gap may exist created between two static parts, or between two moving parts, or may be formed within a single part. When the vehicle is spray painted, there is flow of paint into the gap formed by the two parts or substrates. This overspray is undesirable and requires rectification.

Various methods and devices have been developed and adopted to overcome the flow of paint into such gaps. One method is to adhere a strip of foam-like material to an interior surface of the static or movable part of the vehicle. The material prevents paint flow further into the gap, but a build up of paint between the foam-like material and a surface of the static or movable part results in an unwanted rough paint edge when the material is removed which is apparent both to touch and visually.

Another technique adopted involves folding, lengthwise, a portion of a strip of masking tape, applying the adhesive section of the masking tape to an interior surface of a static part of the vehicle such that a non-adhesive section of the tape protrudes outwardly, and then applying a strip of foam-based material to the masking tape before closing the moving part and spray painting the vehicle. The non-adhesive portion of the folded tape prevents the masking tape from contacting paint sprayed on the static part. This technique often results in a smoother paint line, but is only suitable for particular geometries of gaps. For some vehicles, the foam-based material is compressed by the movable part to an extent that, from within the gap, it protrudes outwardly. This causes paint to 'bridge' between a surface of the movable part and the foam. Such a build up of paint therefore results in an rough paint edge when the foam and tape are removed. Furthermore, this technique is time consuming and requires considerable skill to position the tape and foam correctly.

An additional drawback of using folded masking tape is that, due to the curvature of the gap, there is a tendency for the tape to lift away from the vehicle part, which often results in excessive paint build up.

SUMMARY OF THE INVENTION

It is therefore desirable to achieve a smooth paint line while also preventing flow of paint into a gap for a wide range of gap geometries.

Accordingly, there is provided a masking strip for masking the interior surfaces of a gap between two substrates to be painted, the strip comprising: a backing having a first surface and a second surface, the first surface having an adhesive region to fix the masking strip to an interior surface of the gap; a gap filler extending from the backing and adapted to prevent paint flow into the gap; wherein the first surface of the backing is also provided with a spacing means adapted to space the backing of the masking strip away from the interior surface of the gap to which the strip is fixed and wherein the masking strip is pre-formed.

Preferred and particularly beneficial features of the invention are set out in the appended claims and following description of embodiments of the invention.

A detailed description of preferred embodiments of the invention follows.

DETAILED DESCRIPTION

In the following description references to "paint" should be understood to include a base coat (the coloured paint layer seen on vehicles) and a clear coat (also known as lacquer), and a smooth paint edge is an edge that is smooth to touch, which does not cause a finger nail to catch against the edge of the paint coating.

Figure 1:
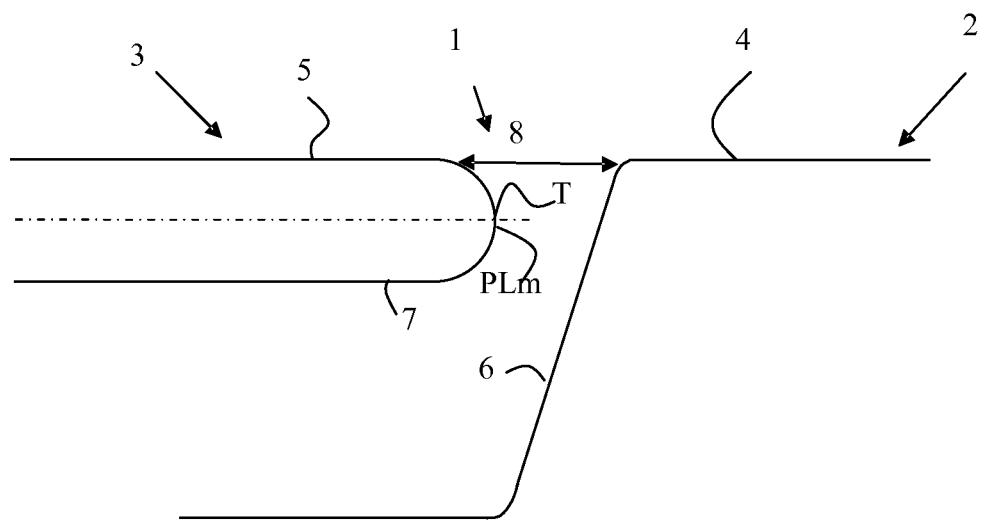
FIG. 1 is a schematic view of a gap between two substrates to be painted.

FIG. 1 is a schematic view of a gap between two substrates to be painted. Both substrates are formed from vehicle parts, to be painted. The gap 1 is formed between a static part 2 and a moveable part 3. In the example shown the static part 2 is a "B" pillar and the moveable part 3 is a door. However, this concept also extends to other static and moveable vehicle parts. The static part 2 presents a first substrate 4 to be painted and the moveable part 3 presents a second substrate 5 to be painted. The gap 1 comprises two interior surfaces. The first interior surface 6 is formed from the interior surface of the static part 2, and the second interior surface 7 is formed from the interior surface of the moveable part 3. The top 8 of the gap 1 is defined as coinciding with the first 4 and second 5 substrates to be painted. The interior surface of the moveable part 3 comprises a curved surface having a turning point T, which is effectively determined by the thickness of the material forming the outer shell of the moveable part 3. A paint line PLm is formed on the moveable part 3 at the boundary between a painted region of the second substrate 5 and a non-painted region on the moveable part 3 and is a line above which the surfaces of the parts are exposed and below which the surfaces are unexposed to paint. The paint line PLm typically lies adjacent to or at the turning point T. A paint line PLs is formed on the static part 2 close to the top 8 of the gap 1 dependent on the positioning of the masking strip. It is at the paint lines PLm and PLs that it is crucial to achieve a smooth application of paint. Ideally therefore there should be minimal or no contact between the masking strip and the portions of the interior surfaces 6, 7 of the gap 1 and any masking strip components at the paint lines PLm and PLs. The position of the paint line however will therefore differ depending on the type, make and model of the vehicle and the geometry of the gap, and the overall positioning of a masking strip as described in more detail below.

Figure 2:
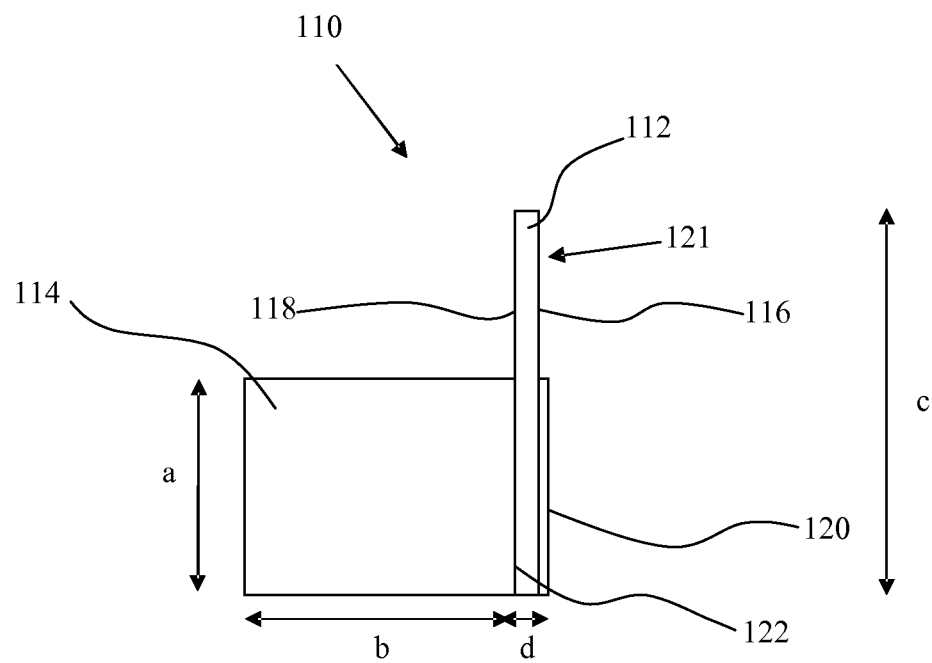
FIG. 2 is an end elevation view of a masking strip according to a first embodiment of the invention.
Figure 3:
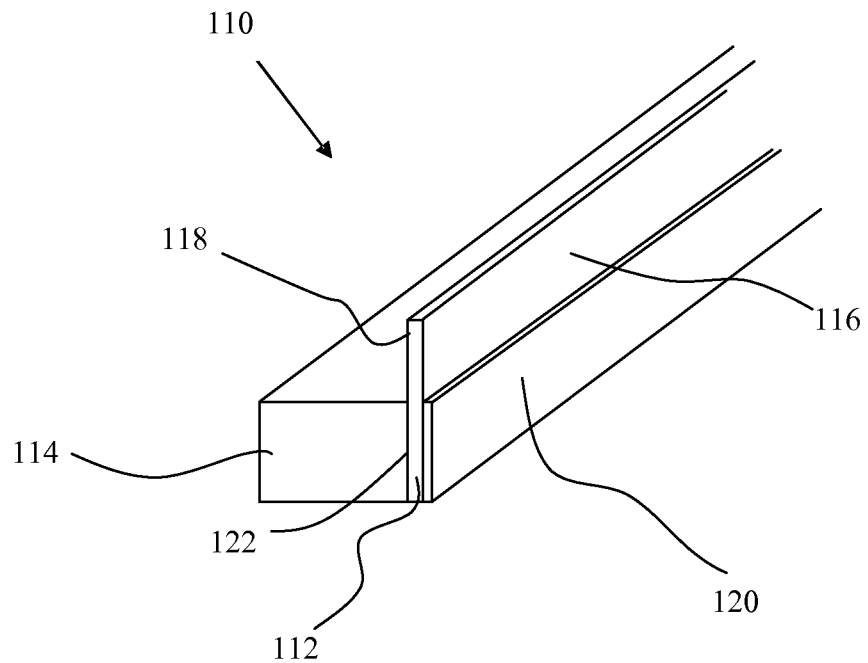
FIG. 3 is a perspective view of the masking strip of FIG. 2.

Referring to FIG. 2 and FIG. 3, a masking strip 110 comprises a backing 112 and a gap filler 114. The gap filler 114 is a section of a flexible, compressible and/or conformable material, and may be a foam-like material, preferably a closed-cell foam material such as a polyurethane foam, and more preferably Caligen X4200AM®. In all embodiments, the material of the gap filler (114, 214, 314) is preferably such that it is able to conform in all dimensions to the curvature of a gap. The height "a" of the gap filler 114 is approximately 5 mm, and preferably between 3 mm and 7 mm. Its width "b" is approximately 10 mm, and is preferably between 5 mm and 15 mm. It will be appreciated that in some embodiments, height "a" may be greater than length b.

The backing 112 is a strip of flexible, compressible and/or conformable material, and is preferably a foam material, and more preferably is a polyethylene foam material, and more preferably is Aveolite TA1001®. In all embodiments, the material of the backing (112, 212, 312) is preferably such that it is able to conform in all dimensions to the curvature of a gap and to the curvature of an interior surface to which it is applied, without the masking strip 110 lifting away from the surface. The material of the backing 112 is preferably denser than the material of the gap filler 114. The backing 112 has a first surface 116 and a second surface 118 opposite to the first surface 116. When viewed in end elevation (FIG. 2), the height "c" of the backing 112 is approximately 8 mm, and preferably between 5 mm and 11 mm. The width or thickness "d" of the backing 112 is approximately 1 mm, and is preferably between 0.8 mm and 1.2 mm.

The first surface 116 of the backing 112 has an adhesive region 120. The adhesive region 120 of the backing 112 comprises any suitable adhesive that is able to secure the masking strip to the interior surface of a gap in use, such that the masking strip is not liable to part from the surface, but also such that there is no residue of the adhesive and when the masking strip is removed from the body part after use. In one form, the adhesive is 3M 3434 masking tape laminated with 3M Laminating Adhesive 300LSE. The height of the adhesive region 120, along height "c" of first surface 116, is approximately 5 mm, and preferably between 3 mm and 7 mm.

The first surface 116 of the backing 112 also has an adhesive free region 121, the height of which is approximately 3 mm, and preferably between 2 mm and 4 mm. When in use, the adhesive free region 121 prevents the top part of the backing from adhering to the interior surface of the gap to which the masking strip is applied. The adhesive free region 121 acts as a means of spacing the backing from the surface to which the strip is applied in order to achieve a smooth paint line on the substrate or body part to be painted proximal the adhesive free region 121 of the backing 112, as will be described in more detail below.

The backing 112 and the gap filler 114 are secured together at interface 122, by any suitable means, but are preferably attached by adhesive, such that the backing 112 and the gap filler 114 are bonded together and are not prone to part in normal use. It will be appreciated that the adhesive region 120 covers approximately the same area of the first surface 116 of backing 112 as the interface 122 area covers on the second surface of the backing 118. When the masking strip 110 is not in use, the adhesive region 120 may be protected by a removable protective tape. As can be seen in FIG. 3, the masking strip 110 is an integral, elongate strip which is accordingly adapted to be applied in a gap.

Figure 4:
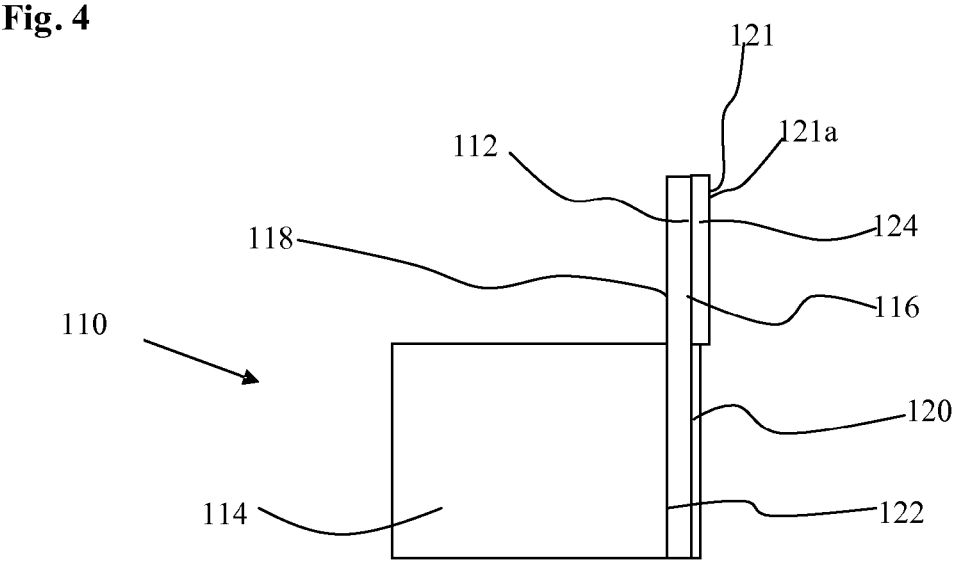
FIG. 4 is an end elevation view of a modified masking strip according to a first embodiment of the invention.
Figure 5:
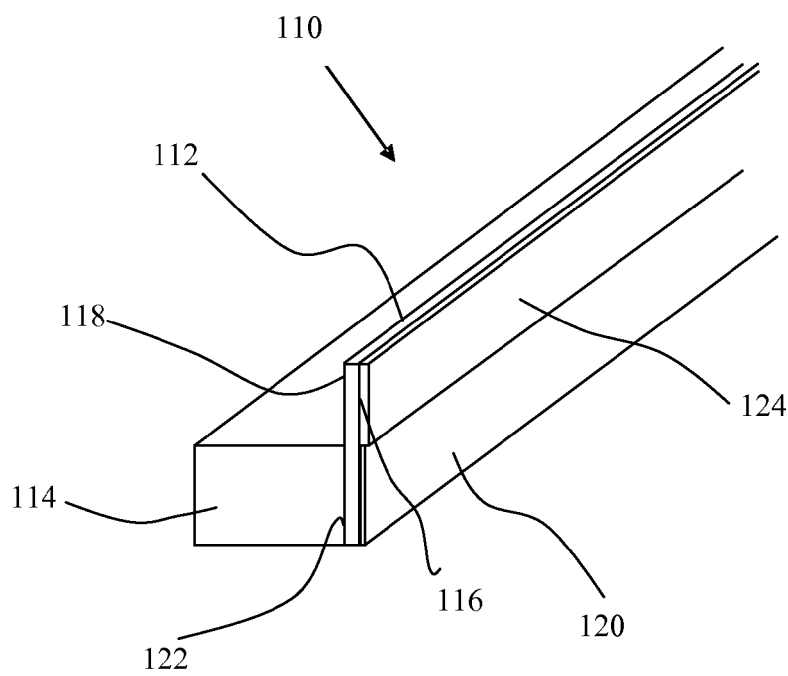
FIG. 5 is a perspective view of the masking strip of FIG. 4.

FIGS. 4 and 5 show a modified masking strip 110 wherein like features are given the same reference number. Similarly, the gap filler 114, backing 112 and adhesive region 120 of the backing 112 are preferably of the same materials and dimensions as the corresponding components described above with reference to FIGS. 2 and 3. With reference to FIGS. 4 and 5, masking strip 110 additionally comprises spacer 124 extending from the previously "adhesive free" region 121 of the first surface 116 of backing 112. The spacer 124 preferably covers the complete area of the region 121 of the first surface 116 of the backing 112 to provide a new adhesive free region 121a. In this form, the spacer 124 acts as a means to space the backing 112 from the surface to which the masking strip 110 is applied in order to achieve, in use, a smooth paint line on the substrate to be painted proximal the spacer 124, as will be described in more detail below.

The spacer 124 is a flexible, conformable material, and is preferably a foam material such as polyethylene foam and more preferably Aveolite TA1008™. Spacer 124 may be the same material as the backing 112. When viewed in cross-section, the spacer 124 is approximately 0.8 mm wide, and preferably between 0.6 mm and 1.1 mm. The spacer 124 is approximately 3 mm high, and preferably between 3 mm and 8 mm high. The backing 112 and spacer 124 are preferably of a denser material than the material of the gap filler 114.

Figure 6:
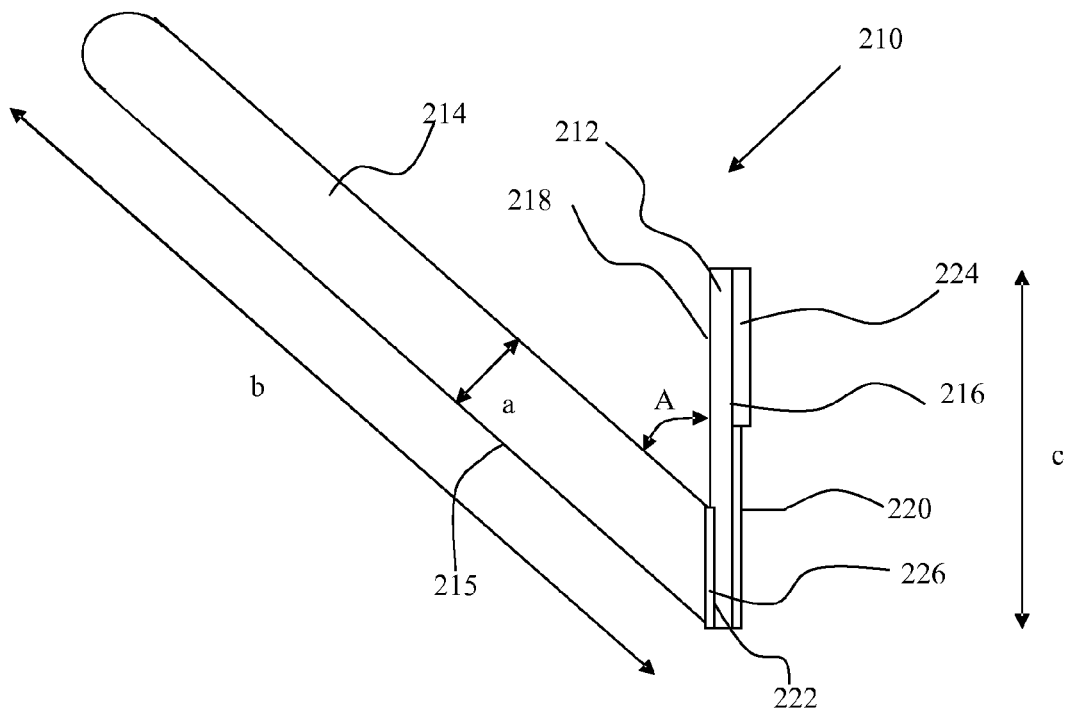
FIG. 6 is an end elevation view of a masking strip according to a second embodiment of the invention.
Figure 7:
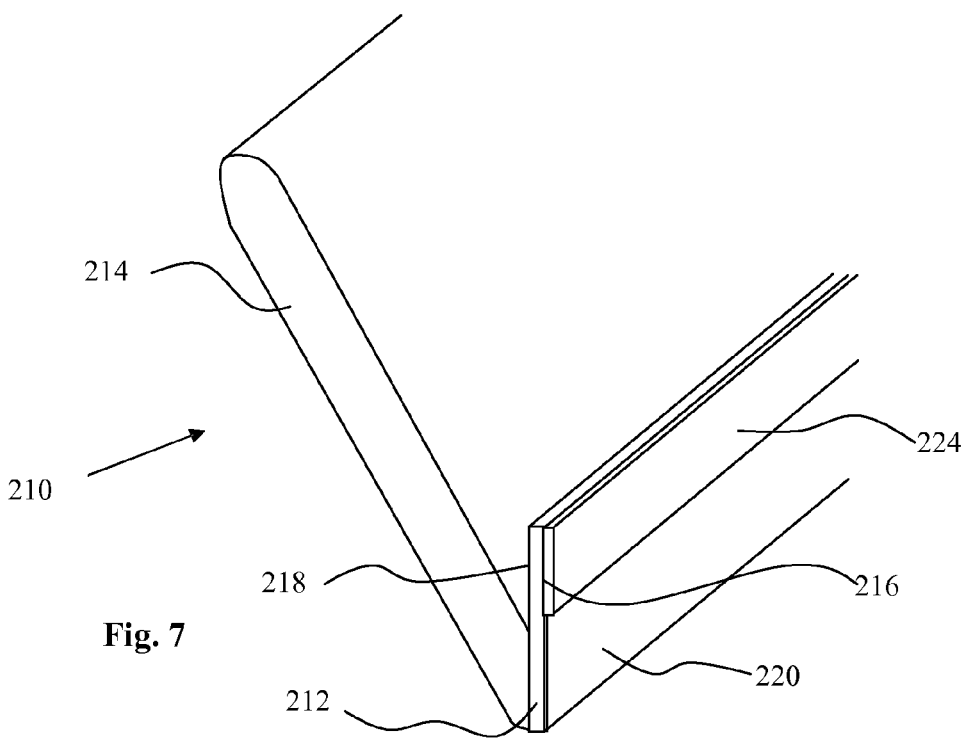
FIG. 7 is a is a perspective view of the masking strip of FIG. 6.

FIGS. 6 and 7 show a second embodiment of the invention. Like components as shown in FIGS. 2, 3, 4 and 5 are denoted by the same last two digits prefixed by the number 2. The gap filler 214 is a strip of flexible, compressible and conformable material and is preferably a foam material, more preferably a closed-cell foam material such as a polyurethane foam and more preferably Caligen x4200AM™. As viewed in cross section, the length "b" of edge 215 of the gap filler 214 is approximately 15 mm, and preferably between 10 mm and 22 mm. Its width "a" is approximately 4 mm, but preferably between 3 mm and 8 mm. The height c of the backing 212 is approximately 8 mm, but preferably between 5 mm and 11 mm. The backing 212 is approximately 1 mm wide, and preferably between 0.8 mm and 1.2 mm. The height c of the backing 212 is approximately 8 mm as before and the height of the spacer 224 is approximately 3 mm as before.

The gap filler 214 is secured to the second surface 218 of the backing 212 by an adhesive region 226 at an interface 222. The adhesive region 226 may comprise any suitable adhesive, such that the backing 212 and the gap filler 214 are bonded together and are not prone to part in normal use. Furthermore, the gap filler 214 and the backing 212 are secured such that an angle A of less than 90 degrees is formed between the backing 212 and the gap filler 214 when the masking strip 210 is not in use (as measured between the ends of the gap filler 214 and the backing 212 furthest away from the point where they are bonded together). Preferably angle A is less than 60 degrees and more preferably between about 50 to about 20 degrees such as approximately 30 degrees. If the gap filler 214 is positioned closer to the top of the backing strip 212 the angle A may be greater than 90°.

Figure 8:
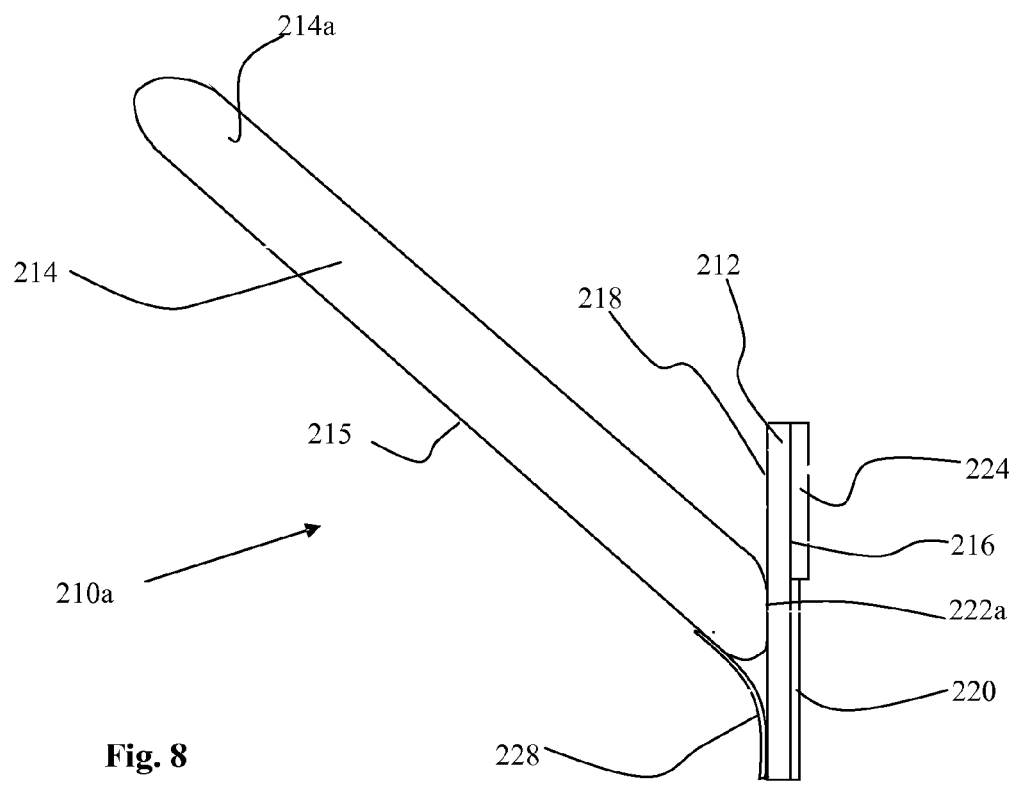
FIG. 8 is an end elevation view of a modified masking strip according to a second embodiment of the invention.

With reference to FIG. 8, a slightly modified masking strip 210a is shown. Here, a lower edge of the gap filler 214 is secured to the second surface 218 of the backing 212 by a substrate 228. The substrate 228 comprises a flexible material, is preferably single-sided adhesive tape. In this embodiment the interface 222a need not comprise any adhesive such that the gap filler 214 and the backing 212 rely for attachment on the substrate 228. The substrate 228 may alternatively be a paper-backed tape, such as masking tape, and may comprise a resin coating on the paper that is heat settable to enable the substrate 228 to be crimped.

In some forms the gap filler 214 can comprise a release liner on surface 215. The release liner may be the exposed, non-adhesive surface of substrate 228, such that the masking strip can be wound in a spiral, whereby the adhesive region 220 does not comprise a protective cover and, when wound, the adhesive of adhesive region 220 contacts the smooth, exposed non-adhesive surface of substrate 228 or the release liner 215. The substrate 228 may, in some forms, cover the entire surface 215 of the gap filler.

Figure 9:
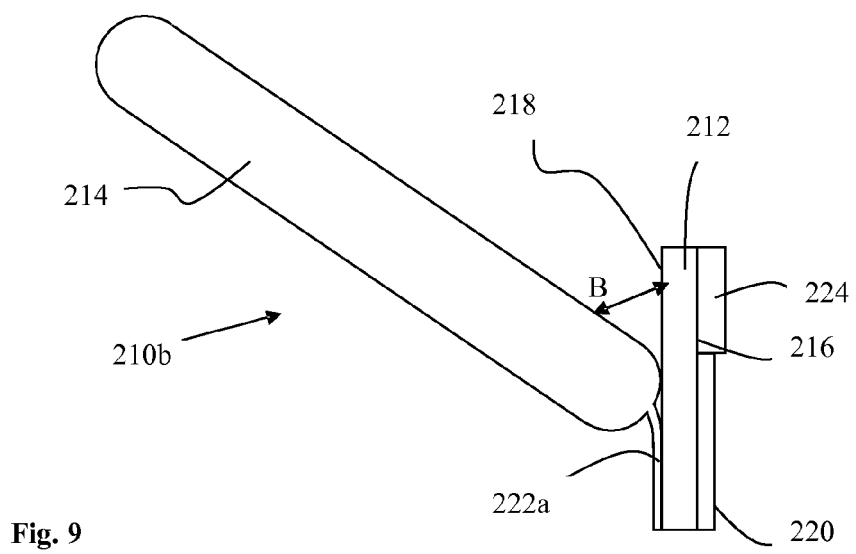
FIG. 9 is an end elevation view of a further modified masking strip according to a second embodiment of the invention.

As a modification to the masking strip shown in FIG. 8, FIG. 9 shows a masking strip 210b. Here, the gap filler 214 is crimped at 228a where it is joined to the backing 212, preferably along its entire length, such that an angle B is created between the backing 212 and the gap filler 214. By having the gap filler 214 extend from the backing 212 at an angle B the repeatability of the position of the moveable part paint line PLm is increased further. For an angle B in the range 30° to 90° (measured between the backing 212 and the gap filler 214 at the point of the gap filler 214 proximal to the backing 212) there will be minimal or no contact between the gap filler 214 and a portion of the second interior surface 7 of the gap 1 at or in the region of the paint line PLm. The angle B may also be greater than the angle A shown in FIG. 6. The gap filler 214 may however contact the underside of the moveable vehicle part 3 away from and below the PLm, depending on the size of the gap 1. The crimping is formed by placing the gap filler 214 under heat and pressure to reduce the volume of the gap filler 214 at the join significantly. This creates a new configuration of the masking strip 210b.

A crimped masking strip enables the gap filler 214 to more easily pivot from the backing 212, such that the angle B formed between the gap filler 214 and the backing 212 is easier to form and consequently there is a lesser tendency for the gap filler 214 to protrude outwardly from the gap. A greater angle B formed between the gap filler 214 and the backing 212 also ensures that compression of the gap filler if in contact with the underside of the moving part is minimised. As will be described in more detail below, excessive compression of the gap filler 214 may cause bridging of paint at PLm and is therefore undesirable.

Figure 10:
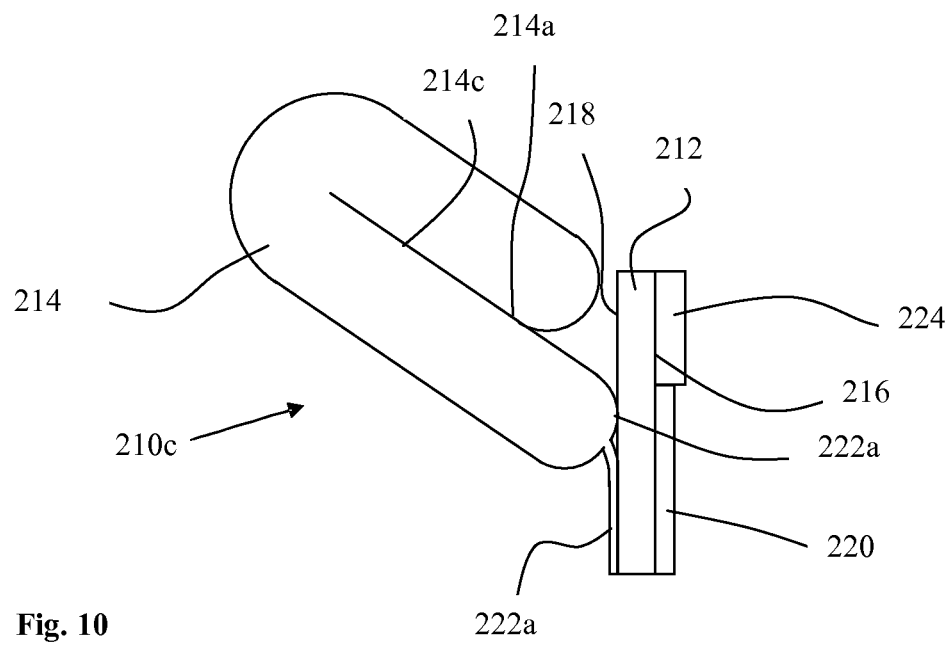
FIG. 10 is an end elevation view of a yet further modified masking strip according to a second embodiment of the invention.

FIG. 10 shows a modification of the embodiment of the masking strip of FIG. 9. Here, the gap filler 214 is crimped at 228a, and is folded in two along its entire length and its furthermost end 214a (as shown in FIG. 10) is close or proximal to the second surface 218 of the backing 212. It is possible to provide the gap filler 214 with an adhesive surface such that when folded it adheres to itself along the interface 214c as shown in FIG. 10. The gap filler 214 may be altered in size to ensure that when folded it fills the gap 1 sufficiently to prevent the flow of paint into the gap 1.

Figure 11:
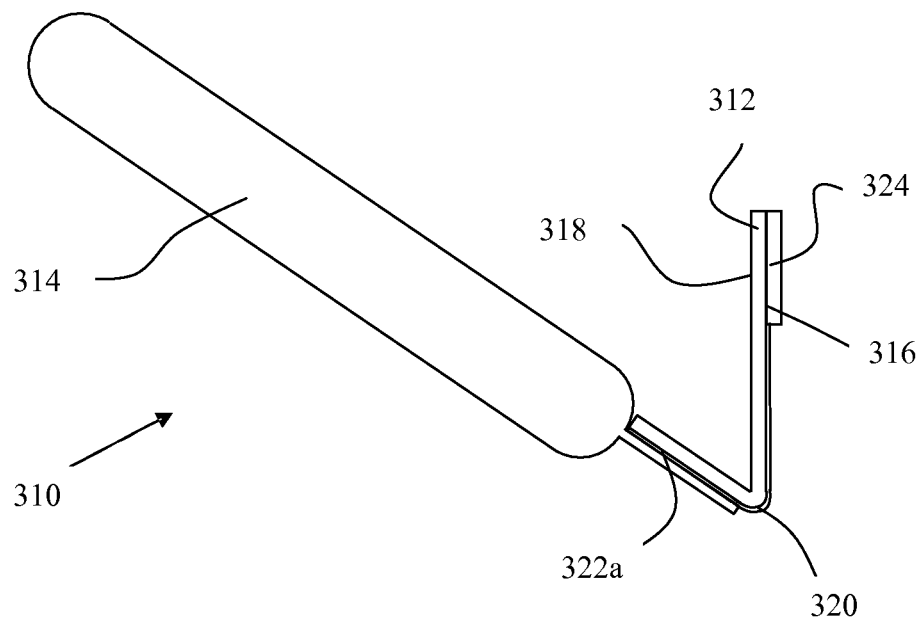
FIG. 11 is an end elevation view of a masking strip according to a third embodiment of the invention.

FIG. 11 shows a masking strip 310 according to a third embodiment of the invention. Like components as shown in earlier Figures are denoted by the same last two digits prefixed by the number 3. In this embodiment, the gap filler 314 is bonded to the first surface 316 of the backing 312 below the adhesive region 320. As before, the adhesive region 320 of the first surface 316 of the backing 312 serves to adhere the masking strip 310 to an interior surface of a gap formed between two substrates to be painted. The backing 312 is of a conformable material to enable it to bend to such an extent that the gap filler 314 is proximal to the second surface 318 of the backing 312 as in previous embodiments when the masking strip 310 is in use. It will be appreciated by those skilled in the art that the embodiment shown in FIG. 11 may also be modified such that the gap filler 314 is crimped (as described above) at a position near the join with the backing 312, and may be greater in size than in other embodiments to accommodate this crimped region.

Prior to use, for any of the embodiments of the masking strip described above with reference to FIGS. 2 to 11, the masking strip may be unwound from a dispenser and cut or torn to the required length (which may be dependent upon the gap to be masked and the type of vehicle). Any protective tape (or separate release liner) covering any adhesive region (120, 220, 320) is removed, and the adhesive region of the backing of the masking strip (110, 210, 310) is secured to an interior surface of a gap to be masked. As an example, and with reference to FIGS. 12 and 13, the adhesive region 120, 220 of the first surface 116, 216 of backing 112, 212 of the masking strip 120, 220, is applied to an interior surface of a static part 2 of a vehicle. Masking strip 110, 210 may be applied gradually such that it curves to follow the curvature of the gap between the movable part 3 and the static part 2. When correctly positioned, the masking strip 110, 210 resides within the gap between the movable part 3 and the static part 2 such that the top or outermost part of the backing is near to the top 8 of the gap 1.

It will be appreciated by those skilled in the art that the extent to which the gap filler 114, 214 is positioned below the paint line PLm in order to effectively seal the gap and prevent excessive flow of paint into the gap will depend on the depth of the landing zone between the static 2 and movable 3 parts of a vehicle body, i.e. the overall size and width of the gap. The depth of the gap may vary between approximately 8 mm and 30 mm, or more, depending on the type of vehicle. The width may vary between approximately 3 mm and 11 mm. The angle of the static part 2 will also influence the gap size.

For some vehicles, the cross section of the moving part 3 may be of an irregular shape, for example, angular and/or 'stepped'. Similarly, the cross section of the static part 2 may be of a shape not illustrated, but angular or 'rounded'. The width of the movable part 3 may vary between 2 mm and 6 mm, depending on the type of vehicle.

Figure 12:
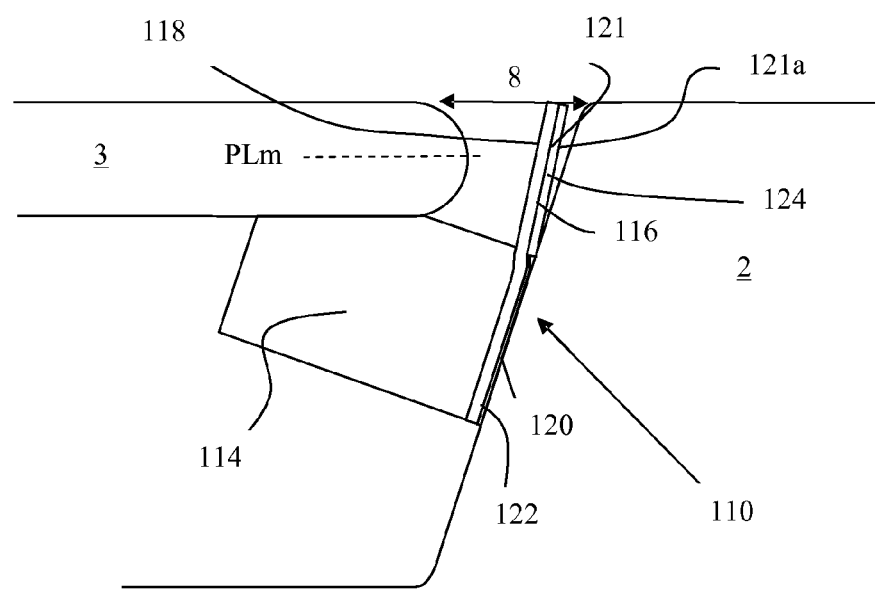
FIG. 12 is an end elevation view of a masking strip according to a first embodiment of the invention positioned in a gap formed between two substrates to be painted.
Figure 13:
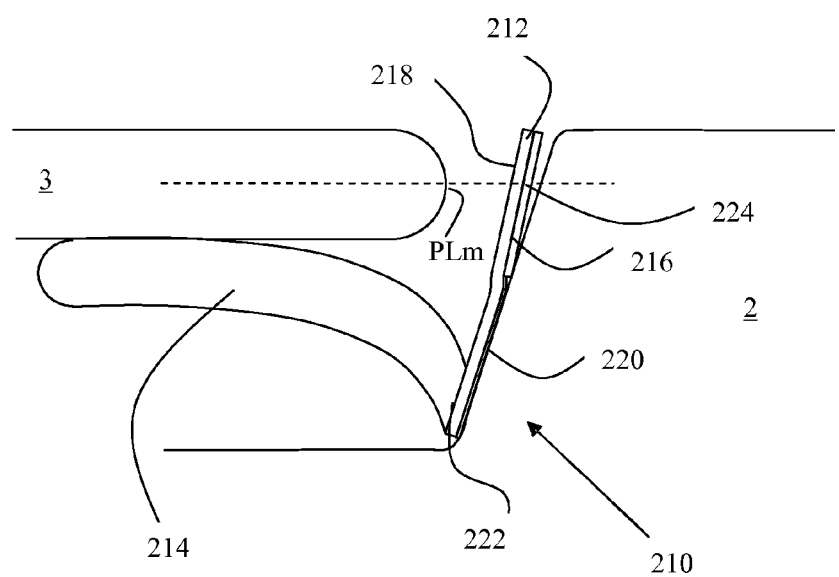
FIG. 13 is an end elevation view of a diagram of a masking strip of a second embodiment of the invention positioned in a gap formed between two substrates to be painted.

FIG. 12 depicts a gap which is relatively 'deep'. The gap filler 114 is positioned below the paint line PLm, the thickness (length b) of the gap filler 114 affects the effectiveness of the gap filler 114 to seal the gap and prevent ingress of paint. However, the dimensions of the gap filler 114 must also be such that it is not compressed and conformed to the extent that it contacts the underside of the moving part 3 within the gap 1. It is therefore preferable that the gap filler 114 has no or minimal contact with a portion of an interior surface of the movable part 3 defining the gap, at or in the region of PLm.

The gap filler 214 of masking strip 210 deforms to lodge under the moving part 3, sufficiently far away from the paint line PLm to prevent bridging of the paint at PLm, and to ensure that the gap filler 214 does not contact the region of the second substrate 5 being painted.

Figure 14:
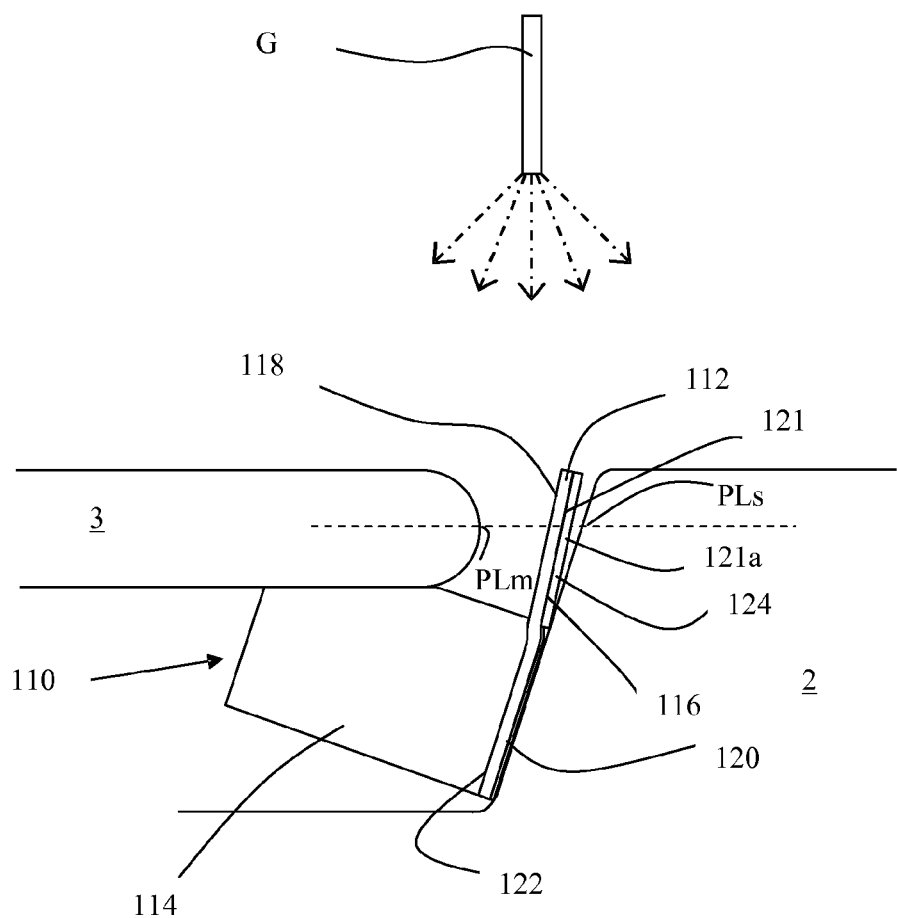
FIG. 14 is an end elevation view of a masking strip of a first embodiment of the invention positioned in a gap formed between two substrates being painted.

FIG. 14 also shows the position of masking strip 110 in use. The masking strip 110 is preferably positioned such that the top of the backing/spacer 112/124 is flush with the top of the gap 8. This ensures the backing/spacer 112/124 of the masking strip 110 prevents paint sprayed from gun G from reaching the static part 2 of the vehicle near the static-part-paint-line PLs (FIG. 14). The spacer 112/124 helps to create a void between the adhesive-free region 121 and the static part 2, such that the bridging of paint between the two surfaces is minimised or prevented.

The dimensions of the gap filler 114 are such that its top corner is under the movable part 3 (when viewed in cross section). Preferably, the dimensions of the gap filler 114 are such that there is no or minimal contact between the gap filler 114 and a portion of the second interior surface 7 of the gap 1 at or in the region of PLm. A smooth paint line near the paint line PLm will therefore result. If the top edge of the gap filler 114 is above the paint line PLm, a build up of paint will occur as the paint bridges between the movable part and the gap filler 114, resulting in a rough paint edge. Any dimension of gap filler 114 as described which effectively fills the gap and makes no or minimal contact with a portion of the second interior surface 7 of the gap 1 at or in the region of PLm, will result in a smooth paint finish of the moving part 3. It will be appreciated that a masking strip of FIG. 2, or indeed that of FIG. 6 without the spacer, would achieve this result.

Figure 15:
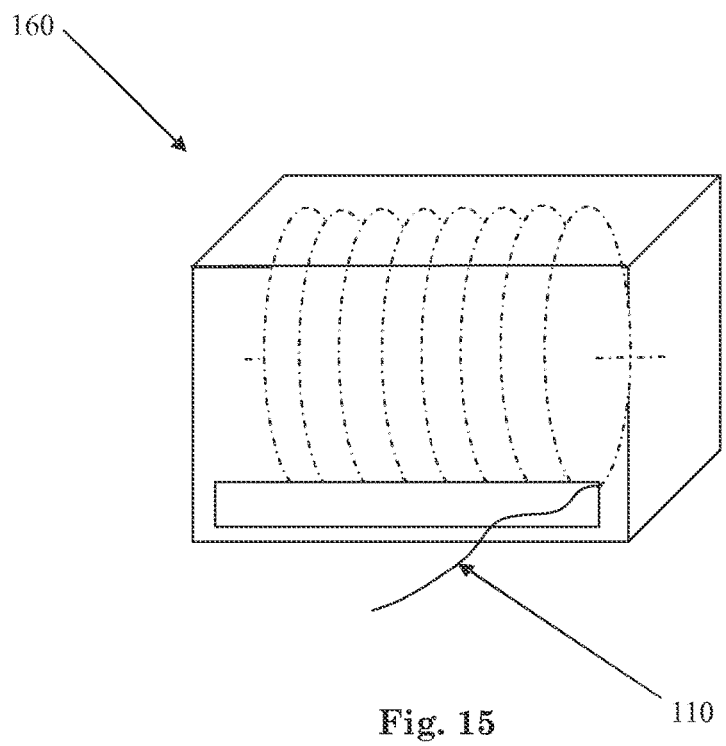
FIG. 15 shows a masking strip dispensing unit.

For all of the embodiments described above, the article is pre-formed, and may be dispensable from a dispensing unit 160. An example of such a unit is shown in FIG. 15. The dispensing unit 160 contains a reel on which a length (perhaps 10 meters) of masking strip 110 is wound. It will also be appreciated that the dispensing unit 160 may contain a number of variations of the masking strip, or only a single type, so that the correct type is selectable depending on the vehicle geometry to be sprayed. An aperture in the unit allows masking strip 110,(210, 310) to be drawn out from the reel and cut to any desired length. A dispensing unit 160 provides a convenient and space effective means of utilising masking strip 110 when needed. The masking strip may be wound on an axis different to that shown in FIG. 15.

Figure 16:
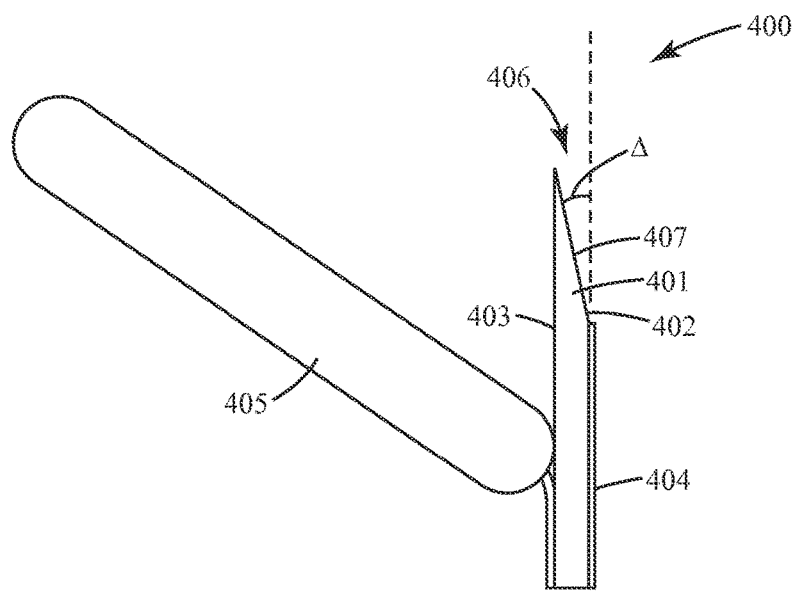
FIG. 16 is a schematic cross-section of a masking strip in accordance with the present invention.

FIG. 16 is a schematic cross-section of a masking strip in accordance with a fourth embodiment of the present invention. The masking strip 400 comprises a backing 401 having a first surface 402 and second surface 403, with the first surface 402 being provided with an adhesive region 404 to fix the masking strip 400 into the interior surface of a gap (not shown). The masking strip 400 is also provided with a gap filler 405 extending from the backing 401, and adapted to prevent paint flow into the gap. The first surface 402 is provided with a spacing means 406 in the form of a bevelled edge 407 being free from adhesive. The bevelled edge 407 illustrated in FIG. 16 is provided at an angle of A to the first surface 401, where A is in the range of 0° to 30°. A series of four samples were made in accordance with the fourth embodiment as described above, where A was chosen to be 0°, 8°, 18° and 30°. The bevelled edge at 0° effectively comprises the first surface 401 having no alteration. It was found in testing that all four samples resulted in an acceptable paint line on the static part, PLs, with the bevelled edges 407 having the smaller angle A yielding the best results. It was found that the thickness of the adhesive region 404 caused the bevelled edge 407 to be positioned away from a static part (not shown) and hence act as a spacing means, even when Δ was 0°. As in the above embodiments, the fourth embodiment is pre-formed.

Various modifications to any of the embodiments described above will be apparent to a person skilled in the art. For example, the adhesive region of the backing may be achieved by applying adhesive to a silicon backing, applying it to the backing and then removing the silicon backing. It will also be understood that the masking strip described could also be used for spray painting any substrate(s) having a gap which requires masking.

The gap filler is preferably adapted to have no or minimal contact with a portion of an interior surface of the gap. This is preferably a portion of the second interior 7 surface at or in the region of the paint line PLm. The spacing means may comprise an adhesive-free region positioned on the first surface of the backing, and the spacing means may comprise a spacer.

The gap filler may extend from the second surface of the backing. The cross section of the backing may be oval, elliptical, rectangular, triangular, a regular polygon or an irregular polygon. The width of the spacer means may be approximately the same as the width of the backing. However, the width of the spacer may be less than the width of the backing, or may be greater than the width of the backing.

The cross section of the spacer may be square, rectangular, triangular, elliptical, circular or polygonal, such as a regular polygon or an irregular polygon. The backing and spacer may also be formed from a single piece of material. The backing may be foam, and/or the spacer may be foam. The adhesive region may preferably comprise adhesive tape. The backing is also preferably flexible to allow the masking strip to be conformed to the gap. A removable protective tape may be provided on the adhesive region of the backing.

The gap filler is preferably compressible and conformable and in some embodiments it may be folded over onto itself parallel with the backing. The gap filler preferably comprises a closed cell foam material, and its cross section may be rectangular, square, elliptical, circular, triangular or polygonal, such as a regular polygon or an irregular polygon. The gap filler may be crimped where it extends from the backing.

In some embodiments, the backing and the spacer may be formed from a single piece of material, by crimping or extruding, for example. The backing and spacer may be formed from several pieces of material. Furthermore, the entire article may be formed from a single piece of material.

In some embodiments the spacer means, provided by the backing (112, 212, 312) and/or spacer 124, 224, 324) is formed to absorb paint, that is to draw paint away from a proximal surface of a part of the vehicle body. The spacer means can comprise an absorbent foam, and or comprise a coating of an absorbing material. Beneficially an absorbing effect is provided to enable a smooth paint line to be formed near the spacer means. Other materials, such as additional layers or coatings may be included either on or as part of the spacer 124, 224, 324, to vary its absorbent properties, release properties, mechanical properties or size, as desired.

The invention claimed is:

1. A masking strip for masking the interior surfaces of a gap defined between a fixed substrate and a moveable substrate to be painted, the masking strip comprising:
   a backing having a first surface and a second surface, the first surface having an adhesive region to fix the masking strip to the fixed substrate along an interior surface of the gap such that a portion of the backing extends into the interior of the gap between the two substrates;
   a gap filler extending from the second surface of the backing and adapted to deform to lodge against an underside of the moveable substrate while having no or minimal contact with a portion on an interior surface of the gap;
   wherein the first surface of the backing is also provided with a spacing means adapted to space the backing of the masking strip away from the interior surface of the gap to which the masking strip is fixed, wherein the spacing means comprises a spacer;
   and wherein the masking strip is pre-formed.

2. The masking strip of claim 1, wherein the spacing means comprises an adhesive-free region positioned on the first surface of the backing.

3. The masking strip of claim 1, wherein the cross section of the backing is oval, elliptical, rectangular, triangular, a regular polygon or an irregular polygon.

4. The masking strip of claim 1, wherein the backing is provided with a bevelled edge.

5. The masking strip of claim 1, wherein the width of the spacer means is the same as the width of the backing.

6. The masking strip of claim 1, wherein the width of the spacer is less than the width of the backing.

7. The masking strip of claim 1, wherein the width of the spacer is greater than the width of the backing.

8. The masking strip of claim 1, wherein the cross section of the spacer is square, rectangular, triangular, elliptical, circular or polygonal.

9. The masking strip of claim 1, wherein the backing and spacer are formed from a single piece of material.

10. The masking strip of claim 1, wherein the backing is foam.

11. The masking strip of claim 1, wherein the spacer is foam.

12. The masking strip of claim 1 wherein the adhesive region comprises adhesive tape.

13. The masking strip of claim 1, wherein the backing is flexible to allow the masking strip to be conformed to the gap.

14. The masking strip of claim 1, wherein a removable protective tape is provided on the adhesive region of the backing.

15. The masking strip of claim 1, wherein the gap filler is compressible and conformable.

16. The masking strip of claim 1, wherein the gap filler is folded over onto itself parallel with the backing.

17. The masking strip of claim 1, wherein the gap filler comprises a closed cell foam material.

18. The masking strip of claim 1, wherein the cross section of the gap filler is rectangular, square, elliptical, circular, elliptical, triangular or polygonal.

19. The masking strip of claim 1 wherein the gap filler is crimped where it extends from the backing.

* * * * *